United States Patent
Martins et al.

(10) Patent No.: US 7,301,547 B2
(45) Date of Patent: Nov. 27, 2007

(54) AUGMENTED REALITY SYSTEM

(75) Inventors: Fernando C. M. Martins, Hillsboro, OR (US); Stephen Junkins, Bend, OR (US); Jason E. Plumb, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 10/104,471

(22) Filed: Mar. 22, 2002

(65) Prior Publication Data

US 2003/0179218 A1    Sep. 25, 2003

(51) Int. Cl.
*G09G 5/00*    (2006.01)
*G06T 15/00*   (2006.01)
*G06K 9/62*    (2006.01)

(52) U.S. Cl. .................. 345/633; 345/419; 382/216

(58) Field of Classification Search ............. 345/632, 345/633, 848, 419; 382/216
See application file for complete search history.

(56) References Cited

U.S. PATENT DOCUMENTS

| | | | |
|---|---|---|---|
| 4,600,919 A | 7/1986 | Stern | 345/473 |
| 4,747,052 A | 5/1988 | Hishinuma et al. | 250/587 |
| 4,835,712 A | 5/1989 | Drebin et al. | 345/423 |
| 4,855,934 A | 8/1989 | Robinson | 345/582 |
| 4,901,064 A | 2/1990 | Deering | 345/426 |
| 5,124,914 A | 6/1992 | Grangeat | 378/50 |
| 5,163,126 A | 11/1992 | Einkauf et al. | 345/423 |
| 5,371,778 A | 12/1994 | Yanof et al. | 378/4 |
| 5,611,030 A | 3/1997 | Stokes | 345/590 |
| 5,625,765 A * | 4/1997 | Ellenby et al. | 345/633 |
| 5,731,819 A | 3/1998 | Gagne et al. | 345/647 |
| 5,757,321 A | 5/1998 | Billyard | 345/426 |
| 5,786,822 A | 7/1998 | Sakaibara et al. | 345/582 |
| 5,805,782 A | 9/1998 | Foran | 345/426 |
| 5,809,219 A | 9/1998 | Pearce et al. | 345/426 |
| 5,812,141 A | 9/1998 | Kamen et al. | 345/587 |
| 5,847,712 A | 12/1998 | Salesin et al. | 345/582 |
| 5,894,308 A | 4/1999 | Isaacs | 345/420 |
| 5,929,860 A | 7/1999 | Hoppe | 345/419 |
| 5,933,148 A | 8/1999 | Oka et al. | 345/427 |
| 5,949,969 A | 9/1999 | Suzuoki et al. | 358/1.17 |
| 5,966,133 A | 10/1999 | Hoppe | 345/420 |
| 5,966,134 A | 10/1999 | Arias | 345/589 |
| 5,974,423 A | 10/1999 | Margolin | 345/606 |
| 6,054,999 A | 4/2000 | Strandberg | 345/474 |
| 6,057,859 A | 5/2000 | Handelman et al. | 345/474 |
| 6,078,331 A | 6/2000 | Pulli et al. | |
| 6,115,050 A | 9/2000 | Landau et al. | |

(Continued)

OTHER PUBLICATIONS

Rander et al. 'Modeling, Combining, and Rendering Dynamic Real-World Events From Image Sequences.' Copyright © Oct. 2, 1998.*

(Continued)

*Primary Examiner*—Ryan Yang
(74) *Attorney, Agent, or Firm*—Fish & Richardson P.C.

(57) ABSTRACT

A virtual reality system surveys a real-world environment, generates 3D data that defines the real-world environment, renders a virtual 3D environment using the 3D data, retrieves a virtual object from a database comprised of pre-stored virtual objects, renders the virtual object in the virtual 3D environment, and re-positions the virtual object in the virtual 3D environment.

27 Claims, 6 Drawing Sheets

U.S. PATENT DOCUMENTS

| | | | |
|---|---|---|---|
| 6,157,747 A * | 12/2000 | Szeliski et al. | 385/284 |
| 6,175,655 B1 | 1/2001 | George et al. | |
| 6,191,787 B1 | 2/2001 | Lu et al. | 345/418 |
| 6,191,796 B1 | 2/2001 | Tarr | 345/581 |
| 6,198,486 B1 | 3/2001 | Junkins et al. | 345/419 |
| 6,201,549 B1 | 3/2001 | Bronskill | 345/441 |
| 6,208,347 B1 | 3/2001 | Migdal et al. | 345/419 |
| 6,219,070 B1 | 4/2001 | Baker et al. | 345/475 |
| 6,239,808 B1 | 5/2001 | Kirk et al. | 345/582 |
| 6,252,608 B1 | 6/2001 | Snyder et al. | 345/473 |
| 6,262,737 B1 | 7/2001 | Li et al. | 345/419 |
| 6,262,739 B1 | 7/2001 | Migdal et al. | 345/423 |
| 6,292,192 B1 | 9/2001 | Moreton | 345/586 |
| 6,317,125 B1 | 11/2001 | Persson | 345/423 |
| 6,337,880 B1 | 1/2002 | Cornog et al. | 375/240.01 |
| 6,388,670 B2 | 5/2002 | Naka et al. | 345/474 |
| 6,405,071 B1 | 6/2002 | Analoui | 600/425 |
| 6,437,782 B1 | 8/2002 | Pieragostini et al. | 345/426 |
| 6,478,680 B1 | 11/2002 | Yoshioka et al. | 463/43 |
| 6,559,848 B2 | 5/2003 | O'Rourke | 345/473 |
| 6,593,924 B1 | 7/2003 | Lake et al. | 345/426 |
| 6,593,927 B2 | 7/2003 | Horowitz et al. | 345/473 |
| 6,608,627 B1 | 8/2003 | Marshall et al. | 345/619 |
| 6,608,628 B1 | 8/2003 | Ross et al. | 345/619 |
| 6,633,304 B2 * | 10/2003 | Anabuki et al. | 345/633 |
| 6,657,637 B1 * | 12/2003 | Nishigori et al. | 345/629 |
| 6,724,386 B2 * | 4/2004 | Clavadetscher | 345/427 |
| 2001/0005425 A1 * | 6/2001 | Watanabe et al. | 382/154 |
| 2001/0026278 A1 | 10/2001 | Arai et al. | 345/474 |
| 2002/0101421 A1 | 8/2002 | Pallister | 345/428 |
| 2002/0154174 A1 * | 10/2002 | Redlich et al. | 345/848 |
| 2002/0158873 A1 * | 10/2002 | Williamson | 345/427 |
| 2003/0025788 A1 * | 2/2003 | Beardsley | 348/43 |
| 2003/0058238 A1 * | 3/2003 | Doak et al. | 345/419 |
| 2003/0146922 A1 * | 8/2003 | Navab et al. | 345/633 |

OTHER PUBLICATIONS

Schwartz "Virtual reality gets less virtual—advances in VRML, graphics processing power make technology accessible to business—includes related article on NASA sites for Mars mission, science-fiction influence on industry—Technology Information." Cop.*

Allison, Don "The Virtual Gorilla Exhibit Project." Copyright © Mar. 5, 1998. Kessler, et al. "The Simple Virtual Environment Library Version 2.0 User's Guide" Copyright © Apr. 16, 1997.*

Allison et al. "Slides from the VRAIS '97 Gorilla Presentation." Copyright © Nov. 7, 1996.*

Huang, Thomas, et al., "Optimal Motion and Structure Estimation." *IEEE Trans. Pattern Analysis and Machine Intelligence*, 15(9):864-884, (Sep. 1993).

Ikeuchi et al., "Acquiring a Radiance Distribution to Superimpose Virtual Objects onto a Real Scene." *IEEE Trans. on Visualization and Computer Graphics*, vol. 5, No. 1, pp. 1-12, (Jan.-Mar., 1999).

Sato, Imari, Yoichi Sato, and Katsushi Ikeuchi, "Illumination Distribution from Brightness to Shadows: Adaptive Estimation Of Illumination Distribution with Unknown Reflectance Properties in Shadow Regions. "*The Proceedings of the Seventh International Institute of Electrical and Electronics Engineers* (IEEE) *Conference*, vol. 2, pp. 875-882 (1999).

Smith, Stephen M. and J.Michael Brady, "SUSAN—A New Approach to Low Level Image Processing." *International Journal of Computer Visions*, 23(1):45-78 (May 1997).

Tomasi, Carlo and Takeo Kanade, "Shape and Motion from Image Streams under Orthography: a Factorization Method." *International Journal of Computer Vision*, 9(2):137-154, (Nov. 1992).

Zang, Zhengyou, "A Flexible New Technique for Camera Calibration." *IEEE Trans. on Pattern Analysis and Machine Intelligence*, 22(11):1330-1334, (2000), and preprint to appear in ICCV'01.

Alliez et al., "Progressive Compression for Lossless Transmission of Triangle Meshes," *ACM SIGGRAPH 2001*, pp. 195-202, Aug. 2001.

Appel, Arthur, "The Notion of Quantitative Invisibility and the Machine Rendering of Solids." Proceedings of 22nd National Conference Association for Computing Machinery 1967.

Bajaj et al., "Progressive Compression and Transmission of Arbitrary Triangular Meshes," *IEEE*, pp. 307-316 (1999).

Buck et al., "Performance-Driven Hand Drawn Animation", *ACM* (NPAR2000), pp. 101-108 (2000).

Catmull et al., "Recursively Generated B-Spline Surfaces on Artitrary Topological Meshes," Computer Aided Design, 10(6):350-355 (1978).

Chow, M., "Optimized Geometry Compression for Real-time Rendering," *IEEE*, pp. 347-354 (1997).

Coelho et al., "An Algorithm for Intersecting and Trimming Parametric Meshes", *ACM* SIGGRAPH, pp. 1-8 (1998).

Cohen-Or, D. et al., "Progressive Compression of Arbitrary Triangular Meshes," *IEEE Visualization 99* Conference Proc., pp. 67-72, Oct. 1999.

Deering, M., "Geometry Compression," *Computer Graphics.* SIGGRAPH '95, pp. 13-20, 1995.

DeRose et al., "Subdivisional Surfaces in Character Animation", *ACM*, SIGGRAPH'98, pp. 85-94 (1998).

Dyn, N. et al., "A Butterfly Subdivision Scheme for Surface Interpolation with Tension Control," *ACM Transactions on Graphics*, 9(2): 160-169 (1990).

Elber, Gershon, "Line Art Rendering via a Coverage of Isoperimetric Curves," IEEE Transactions on Visualization and Computer Graphis, 1(3):231-239 (1995).

Elber, Gershon, "Interactive Line Art Rendering of Freeform Surfaces", *Eurographics'99*, 18(3):C1-C12 (1999).

Foley, et al., "Computer graphics: principal and practice." *Addision-Wesley Publishing Company*, Reading, MA, 1996: 1060-1064.

Gooch et al., "A Non-Photorealistic Lighting Model for Automatic Technical Illustration," *Computer Graphics Proceedings, Annual Conference Series*, SIGGRAPH'98, pp. 447-452 (1998).

Gooch et al., "Interactive Technical Illustration," *ACM Interactive 3D*, pp. 31-38 (1999).

Heidrich et al., "Realistic, Hardware-Accelerated Shading and Lighting," *ACM*, (SIGGRAPH'99), pp. 171-178 (1999).

Hoppe, H., "Progressive Meshes," URL: http://www.research.microsoft.com/research/graphics/hoppe/, (10 pgs.), 1996.

Hoppe, H., "Efficient Implementation of Progressive Meshes," Comput. & Graphics, 22(1), pp. 27-36 (1998).

Hoppe, H., "View-Dependent Refinement of Progressive Meshes", URL: http://www.research.microsoft.com/~hoppe/ (10 pgs.), 1997.

Kumar et al., "Interactive Display of Large Scale NURBS Models", *ACM*, Symp. On Interactive 3D Graphics, pp. 51-58 (1995).

Lake et al., "Stylized Rendering Techniques for Scalable Real-time 3D Animation", NPAR, pp. 101-108 (2000).

Lander, Jeff, "Making Kine More Flexible,"Game Developer Magazine, 5 pgs., Nov. 1998.

Lander, Jeff, "Skin Them Bones," Game Developer Magazine, 4 pgs., May 1998.

Lansdown et al., "Expressive Rendering: A Review of Nonphotorealistic Techniques," IEEE Computer Graphics & Applications, pp. 29-37 (1995).

Lasseter, J. et al., "Principles of Traditional Animation Applied to 3D Computer Animation," *ACM*, pp. 35-44 (1987).

Lee, M. et al., "Navigating Through Triangle Meshes Implemented as Linear Quadtrees," *ACM Transactions on Graphics*, 19(2): 79-121 (2000).

Lewis, J. P. et al., "Pose Space Deformation: A Unified Approach to Shape Interpolation and Skeleton-Driven Deformation," *ACM*, (SIGGRAPH 2000), pp. 165-172 (2000).

Ma et al., "Extracting Feature Lines for 3D Unstructured Grids," *IEEE*, pp. 285-292 (1997).

Markosian, L. et al., "Real-Time Nonphotorealistic Rendering," SIGGRAPH'97, 6 pgs. (1997).

Pajarola et al., "Compressed Progressive Meshes" *IEEE Transactions on Visualization and Computer Graphics*, 6(1):79-93 (2000).

Pedersen, "A Framework for Interactive Texturing on Curved Surfaces", *ACM*, pp. 295-301 (1996).

"pmG Introduces Messiah: Animate 3.0", URL: http://www.digitalproducer.com/aHTM/Articles/july_2000/july_17_00/pmg_intros messiah_animate.htm (Accessed Oct. 26, 2004) 2 pgs.

Popovic et al., "Progressive Simplicial Complexes" Microsoft Research, http://www.research.microsft.com/~hoppe/, 1997.

Pueyo, X. et al., "Rendering Techniques '96," Proc. of Eurographics Rendering Workshop 1996, EUROGRAPHICS, p[gs. 61-70 (1996).

Raskar, R. et al., "Image Precision Silhouette Edges," Symposium on Interactive 3D Graphics, *ACM*, pp. 135-231 (1999).

Rockwood, A. et al., "Real-time Rendering of Trimmed Surfaces," Computer Graphics (SIGGRAPH '89 Proceedings) 23:107-116 (1989).

Samet, Hanan, "Applications of Spatial Data Structures: Computer Graphics, Image Processing, and GIS," University of Maryland, Addison-Wesley Publishing Company, 1060-1064, Reading, MA, Jun. 1990.

Sousa, M., et al., "Computer-Generated Graphite Pencil Rendering of 3-D Polygonal Models", Eurographics'99, 18(3):C195-C207 (1999).

Stam, J., "Exact Evaluation of Catmull-Clark Subdivision Surfaces at Artitrary Parameter Values", SIGGRAPH 98 Conference Proceedings, Annual Conference Series, pp. 395-404 (1998).

Taubin et al., "3D Geometry Compression", SIGGRAPH'98 Course Notes (1998).

Taubin et al., "Progressive Forest Spilt Compression," IBM T.J. Watson Research Center, Yorktown Heights, NY 9 pgs. (1998).

Thomas (Contributor) et al., "The Illusion of Life: Disney Animation" 47-51, 1984.

Wilhelms, J. & Van Gelder, A., "Anatomically Based Modeling," Univ. California Santa Cruz [online], 1997 [retrieved Dec. 22, 2004], retrieved from the Internet: <URL: http://graphics.stanford.edu/courses/cs448-01-spring/papers/wilhelms.pdf>.

Zeleznik et al., "SKETCH: An Interface for Sketching 3D Scenes" Brown University site of the NSF Science and Technology Center for Computer Graphics and Scientific Visualization, 1996.

Zorin "Interpolation Subdivision for Meshes With Arbitrary Topology" Department of Computer Science, California Institute of Technology, Pasadena, CA.

Beets, Kristof, "PVRSG Tile Based Rendering" A technical article posted to the web: http://www.ping.be/powervr/PVSGRendMain.htm, 1998.

Paolo Favaro, et al., "Real-time Virtual Object Insertion", *IEEE Computer Society*, 2001.

* cited by examiner

AUGMENTED REALITY SYSTEM

TECHNICAL FIELD

This application relates to a virtual reality system that generates a virtual three-dimensional (3D) environment from a real-world environment and renders a virtual 3D object in the virtual 3D environment.

BACKGROUND 3D graphics may be used to implement a virtual reality system. Conventional virtual reality systems "inject" a user into a fictitious virtual 3D environment. In that environment, the user can interact with objects, characters, and the like as if in the real world.

DESCRIPTION

Figure 1:
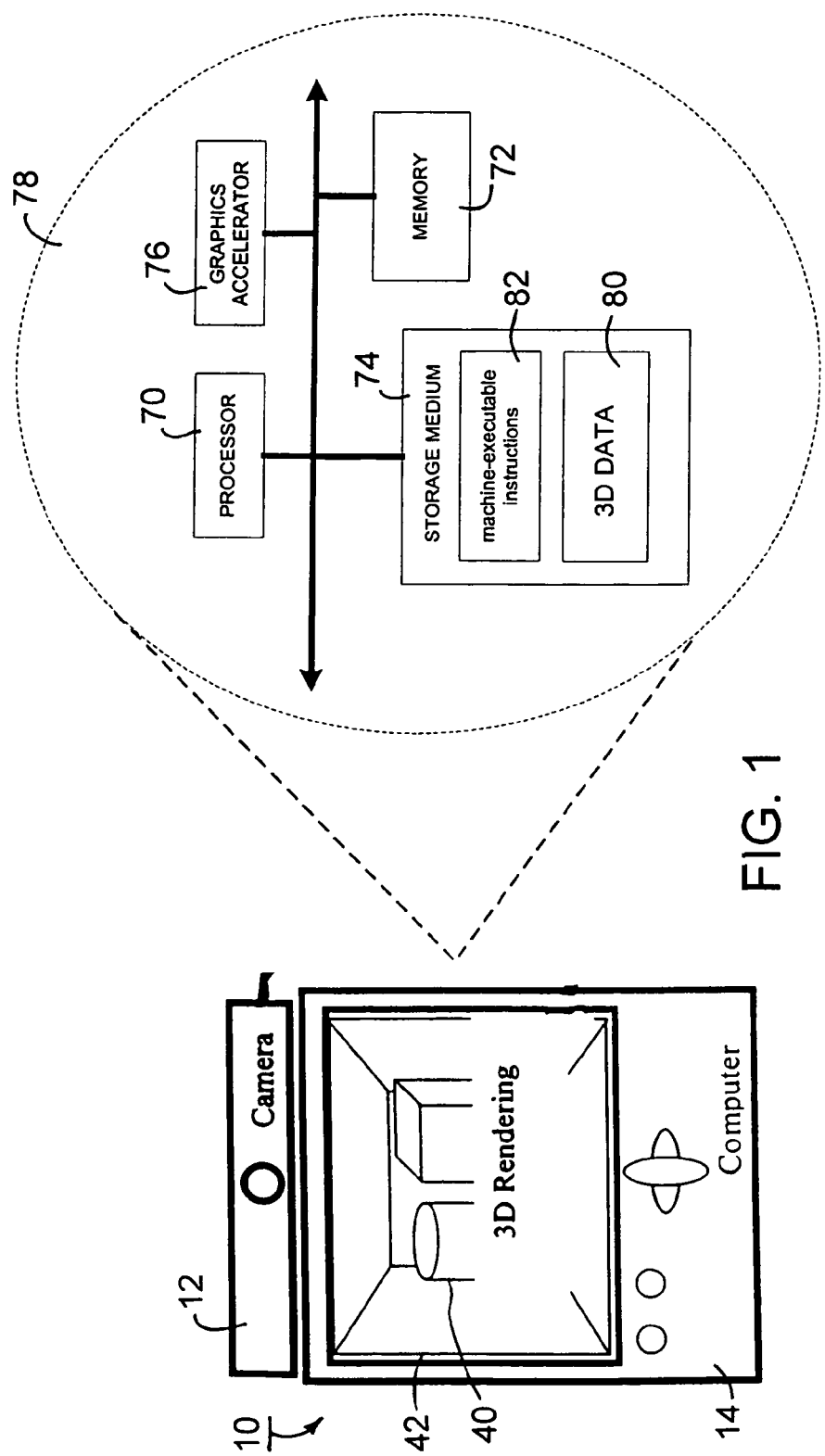
FIG. 1 is a block diagram of a virtual reality system.

FIG. 1 shows a virtual reality system 10. Virtual reality system 10 includes a camera 12 and a computer 14. Camera 12 may be a digital video camera that is capable of capturing frames of video data. Computer 14 may be a handheld computer, such as a Palm Pilot®, that is capable of rendering a virtual 3D environment from the captured video. Camera 12 and computer 14 are tethered to each other in this embodiment; however, they may be untethered.

Figure 2:
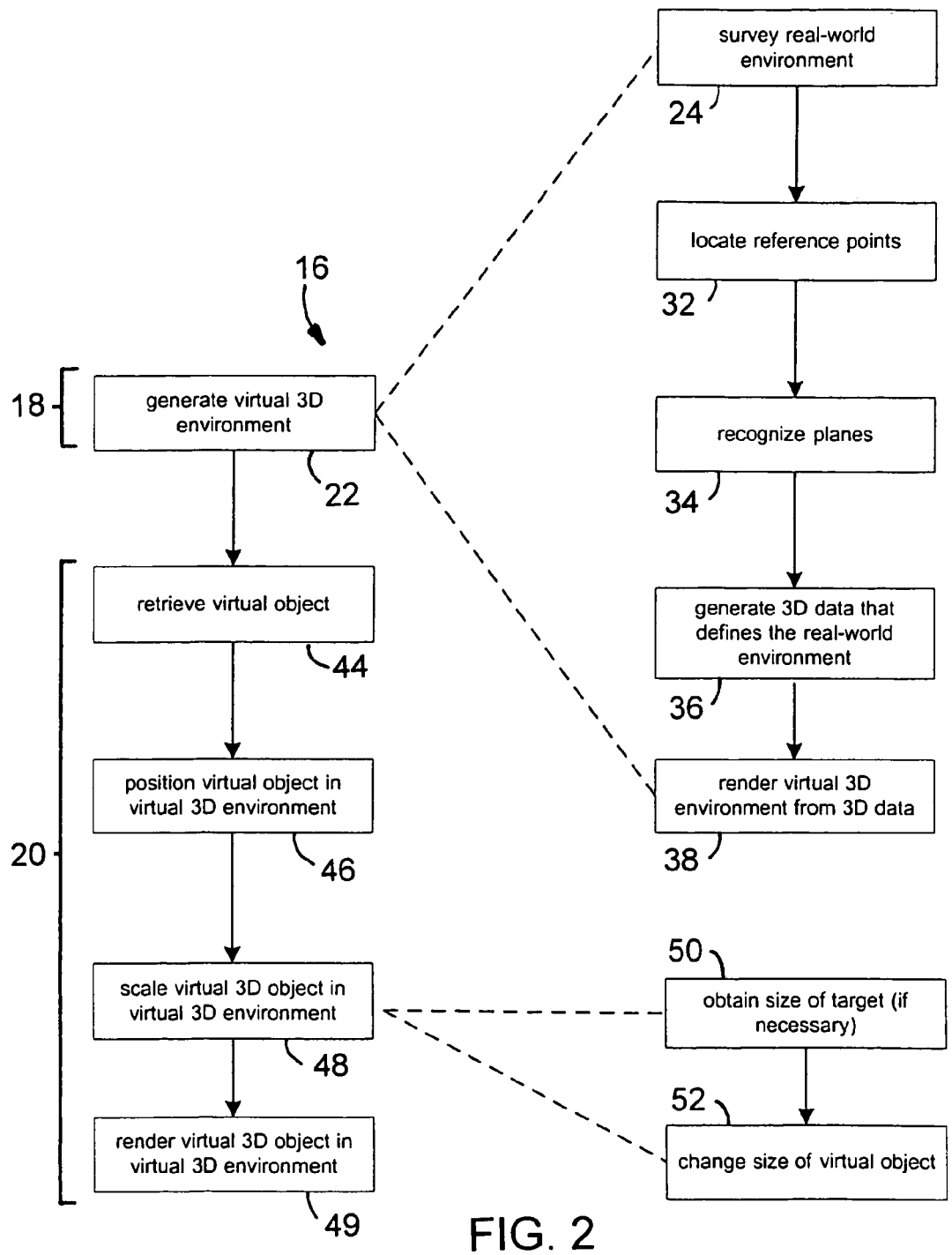
FIG. 2 is a flowchart of a process performed using the virtual reality system.

FIG. 2 shows a process 16, performed by computer 14, for generating a virtual 3D environment from a real-world environment and placing virtual objects in that virtual 3D environment. Unlike conventional virtual reality systems that place a user into a fictitious environment, the augmented reality system of process 16 generates a 3D version of a real-world environment and places virtual objects into the 3D version of the real-world environment.

By way of example, a user may generate a virtual 3D version of a real-world living room. The user may then furnish the resulting virtual living room with virtual 3D objects, such as furniture, artwork, and the like. The virtual objects may be rearranged, as desired, in order to obtain a pleasing layout of the room. Thus, the virtual reality system described herein provides a 3D preview of a real-world space augmented with computer-generated virtual elements, hence the name "augmented reality". The virtual reality system has other applications as well.

Referring to FIG. 2, process 16 includes a pre-processing stage 18 and a run-time stage 20. Pre-processing stage 18 may be performed only once for each real-world environment that is to be modeled. Run-time stage 20 may be performed each time a virtual object is to be placed into a virtual 3D model of the real-world environment.

Process 16 generates (22) a virtual 3D environment. To generate the virtual 3D environment, process 16 surveys (24) a real-world environment, such as a room. The user walks camera 12 around the room, capturing frames of two-dimensional (2D) video data from different positions in the room. Process 16 uses these frames to generate a 3D model of the room.

Figure 3:
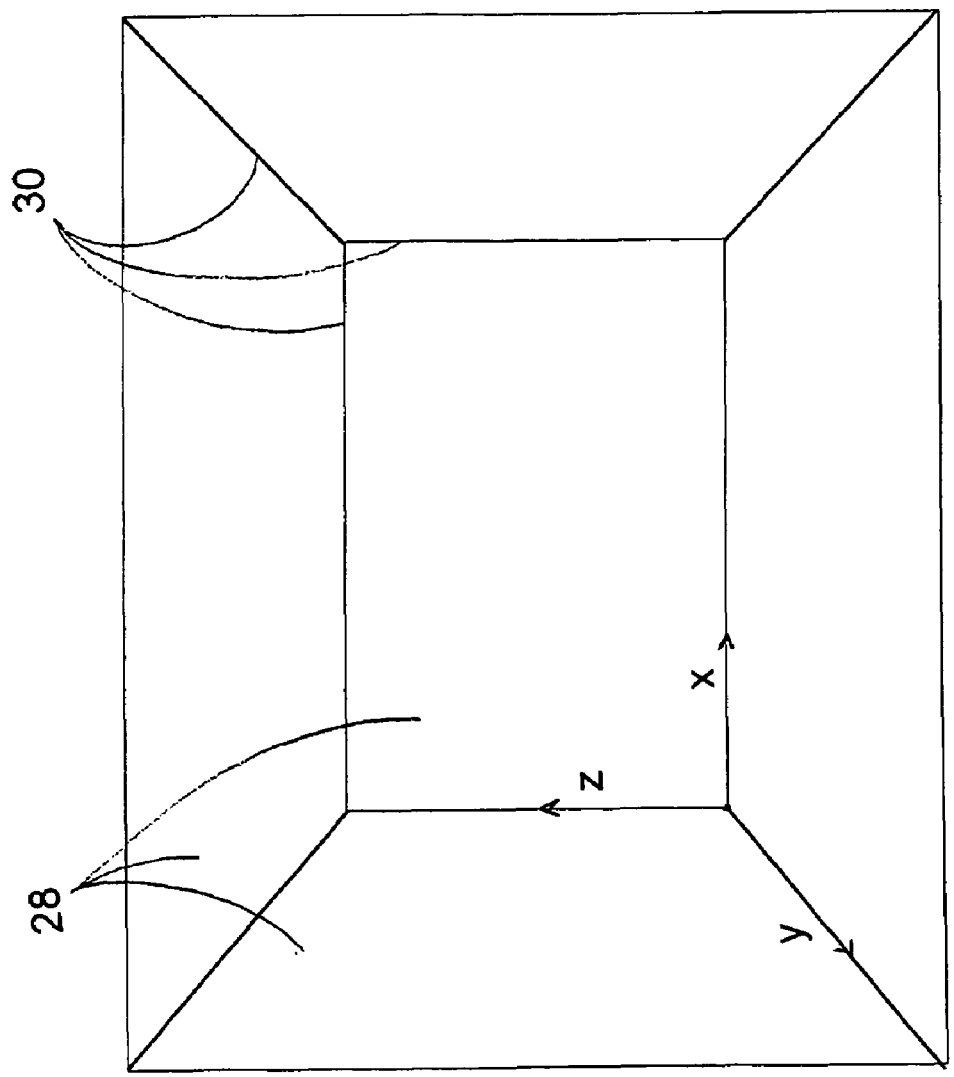
FIG. 3 is a perspective view of a room in the real world.

To this end, process 16 extracts features of the room (the real-world environment, in this example) from the frames of 2D video data. These features include planes and reference points, such as corners, in the real-world environment. FIG. 3 shows a room 26 that contains planes 28 and corners 30.

Process 16 locates (32) corners 30 in room 26 using standard corner detection processes and performs standard position ("pose") estimation processes to determine the location of camera 12 in the room. Process 16 tracks the motion of the corners over a predetermined time frame (which corresponds to a given number of frames of 2D video). It is noted that the corners themselves do not move within the room, but rather they move relative to camera 12 exclusively due to the motion of camera 12. It is this relative motion that is being tracked. Based on the locations of the corners and their movement over time, process 16 determines the position of camera 12 relative to the corners for each frame of video.

The camera position is used when constructing a virtual 3D version of the room. That is, knowing the camera position, allows process 16 to know the perspective from which each frame was taken. Knowing the perspective of each frame allows process 16 to determine where in the virtual 3D environment the additional virtual elements should be positioned.

Process 16 recognizes (34) planes in the real-world environment that are bounded by the corners. Process 16 recognizes planes by identifying clusters of three or more points (e.g., pixels) of the 2D video that behave similarly during motion of camera 12. For example, as camera 12 moves toward a cluster of pixels, the pixels may appear to "grow", i.e., they may appear larger because they become closer to the camera. Pixels on the same plane may appear to "grow" by about the same amount. Examples of planes that may be identified include a floor, ceiling, and walls of a room.

Once process 16 identifies the corners and planes from the 2D frames of video, process 16 generates (36) 3D data that defines the corners and the planes of the 3D environment relative to the camera positions. The 3D data may define Cartesian XYZ coordinates of pixels that make up the corners and planes of the virtual 3D environment. Other types of 3D data may alternatively be used.

Process 16 renders (38) the virtual 3D environment (e.g., virtual living room) from the 3D data. The virtual 3D environment 40 is rendered on the display screen 42 of computer 14. A user can then populate this virtual 3D environment with virtual objects retrieved by computer 14.

In more detail, the user selects a virtual 3D object from a database, along with a location in the virtual 3D environment where the selected virtual 3D object is to be displayed. The selections may be made using a light pen, stylus on a touch screen, or any other type of computer interface. As noted above, the virtual 3D objects may be virtual 3D representations of furniture or the like. Process 16 retrieves (44) the selected virtual 3D object from the database and positions (46) it at the appropriate location. Positioning is performed in response to user input.

In order to achieve a realistic effect, process 16 may scale (48) the selected virtual 3D object (i.e., model) before rendering. In this context, scaling may include changing the size of the virtual 3D object so that the virtual 3D object is appropriate given the size of the virtual 3D environment.

Process 16 scales the virtual 3D object by obtaining (50) the size of a target object in the real-world environment and changing (52) the size of the virtual 3D object in accordance with the size of the target. For example, the size of an object (e.g., the height of a ceiling, distance between two objects, etc.) in the 3D environment may be captured beforehand. Using the size of the target as a reference, process 16 may change the size of the virtual 3D object so that its size is smaller or larger to correlate substantially to the size of the target. Process 16 then renders (49) the virtual objects in the virtual environment.

By way of example, process 16 may retrieve a virtual 3D model for a table from a database. Data for the table may include its dimensions, such as length, width and height. Knowing these dimensions and the size of the target, process 16 can scale the table to its appropriate size within the virtual 3D environment and then render the virtual table.

Process 16 continuously tracks the position of the camera during movement throughout the real-world 3D environment and updates the position of the camera periodically in order to ensure that virtual objects are placed at correct locations within the virtual 3D environment. That is, process 16 uses the position of the camera to further refine (and render) the definition of the virtual 3D environment and to place the virtual objects within the virtual 3D environment.

Process 16 may also illuminate the virtual 3D object in the virtual 3D environment to simulate lighting from one or more light sources in the real-world environment. This may be done using well-known processes, such as that described in "Adaptive Estimation Of Illumination Distribution With Unknown Reflectance Properties In Shadow Regions", by Sato, I, Sato, Y., and Ikeuchi, K., The Proceedings of the Seventh International Institute of Electrical and Electronics Engineers (IEEE) Conference, Vol. 2, pgs. 875–882 (1999).

Figure 4:
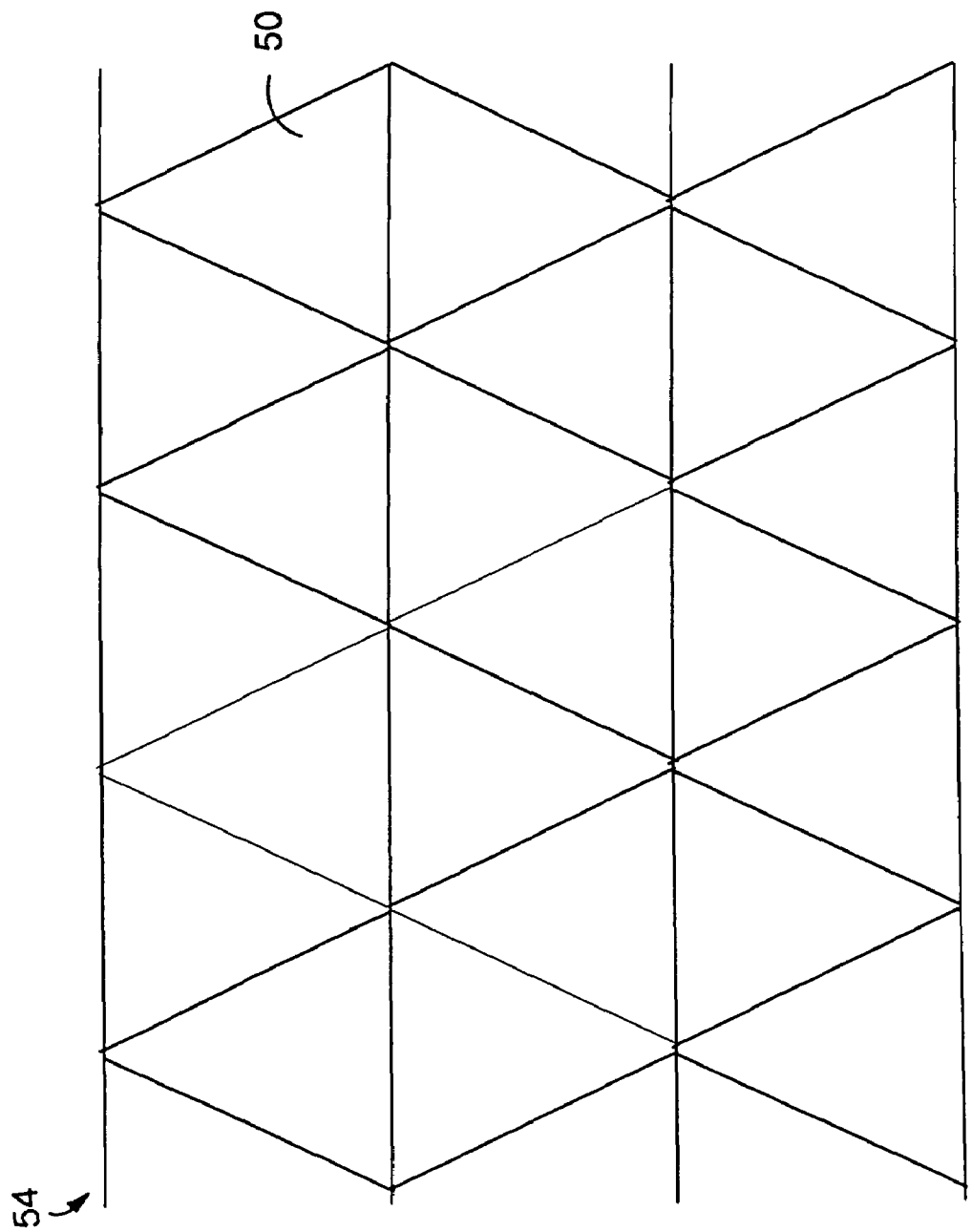
FIG. 4 is a block diagram of polygons that make up a virtual 3D environment.

Referring to FIG. 4, 3D data for a virtual 3D environment defines interconnecting polygons 54. Polygons 54 are triangles in this embodiment; however, other types of polygons may be used to construct the 3D environment.

Figure 5:
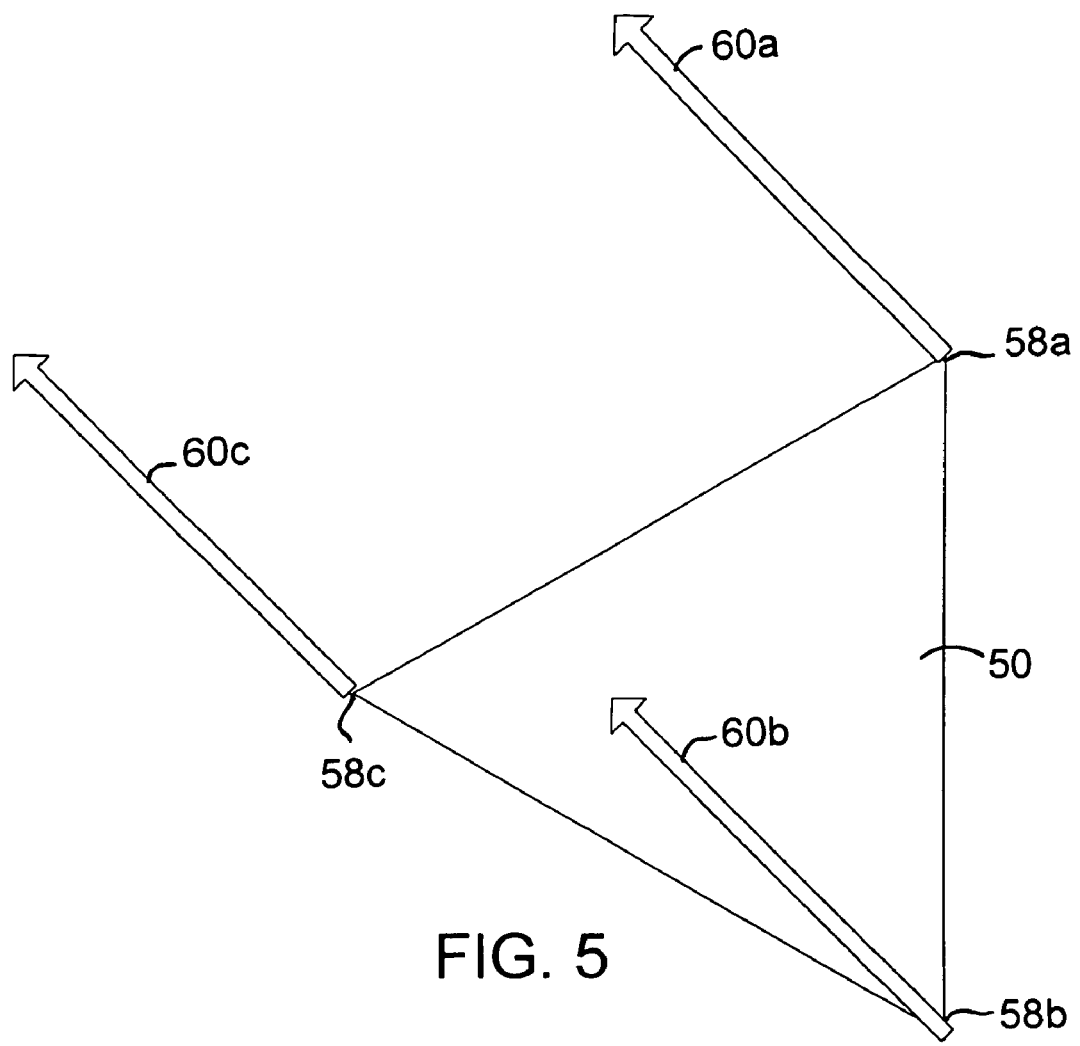
FIG. 5 is a close-up view of one of the polygons.
Figure 6:
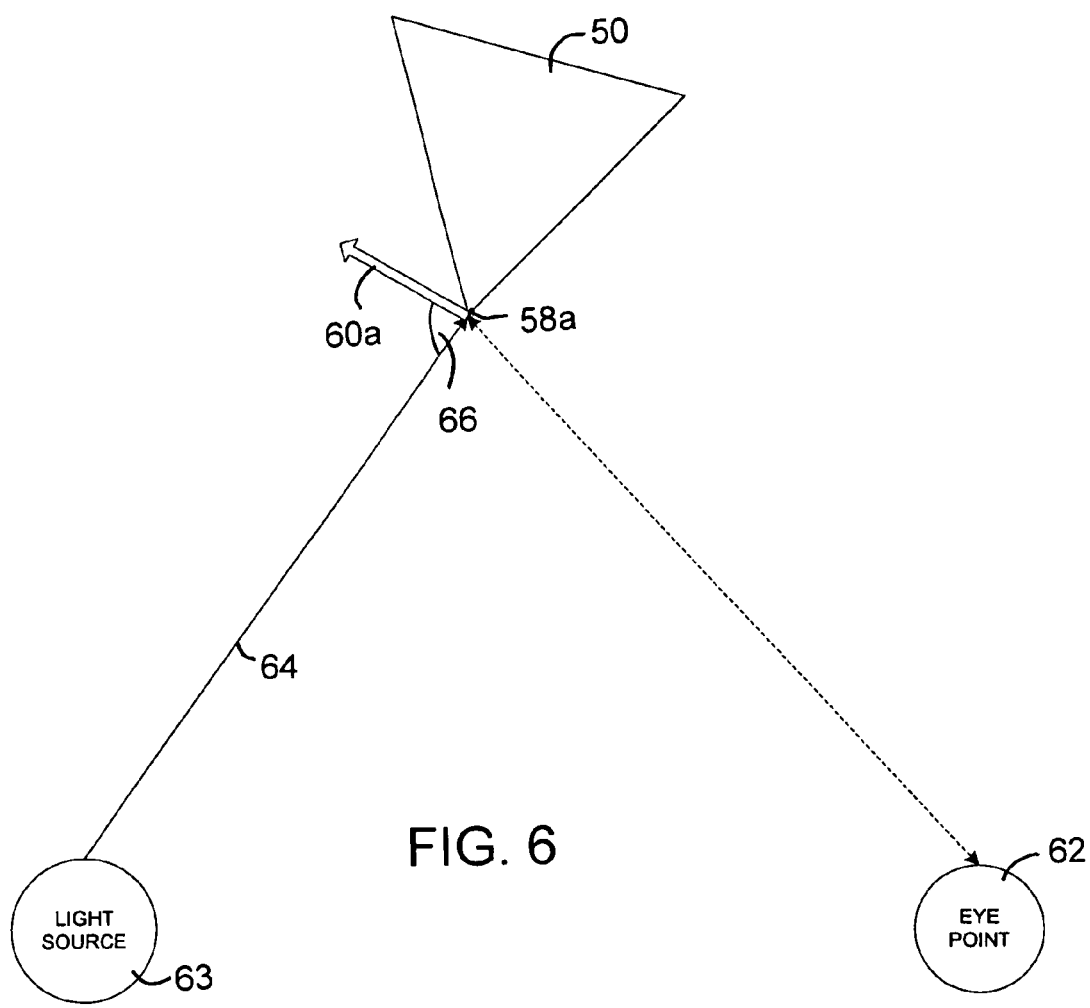
FIG. 6 is a block diagram showing how the polygon of FIG. 5 is illuminated in a virtual 3D environment.

Referring to FIG. 5, the 3D data for a polygon 50 is comprised of coordinates for three vertices 58*a*, 58*b* and 58*c* positioned in Cartesian XYZ (or other) space. A unit normal vector ("normal") 60*a*, 60*b* and 60*c* at each respective vertex 58*a*, 58*b* and 58*c* affects how the vertex is perceived relative to a predefined reference point (the "eyepoint") 62 (FIG. 6) in the virtual 3D environment. Taking vertex 58*a* as an example in FIG. 6, normal 60*a* determines the amount of light that reaches vertex 58*a* from a predefined light source 63 in the virtual world. The amount of light is determined using the dot product of unit normal 60*a* and a unit vector 64 from the light source. The dot product value defines the cosine of angle 66 between the light and the normal. The shading applied to each polygon face is determined based on this angle, as described below. Coordinates for the normals may be stored with the 3D data for each vertex.

Process 16 can change the illumination of the objects by altering the positions of virtual light sources in the virtual 3D environment and/or adding virtual light sources. Process 16 can also affect how the lighting hits the virtual objects by changing the positions of normal vectors on the virtual 3D object. Thus, process 16 can simulate light hitting an object from both an inside light source, such as a lamp, and/or outside light, such as a window. This provides for a more realistic overall effect in the resulting simulation. Also, the colors of the various light sources may be varied.

Process 16 also permits a user to re-position virtual 3D objects in the virtual 3D environment. For example, a user may drag and drop a virtual 3D object from one location in the virtual 3D environment to another location. This allows the user to experiment with several different layouts.

As shown in FIG. 1, computer 14 may include a processor 70, a memory 72, a storage medium 74 (e.g., a computer hard disk), and a 3D graphics accelerator 76 for rendering the virtual 3D environment and processing 3D data (see view 78). Storage medium 74 stores 3D data 80 that defines the virtual 3D environment, and machine-executable instructions 82, which are executed by processor 70 out of memory 72 to perform process 16.

Process 16, however, is not limited to use with the hardware and software of FIG. 1; it may find applicability in any computing or processing environment. Process 16 may be implemented in hardware, software, or a combination of the two. Process 16 may be implemented in computer programs executing on programmable computers that each includes a processor, a storage medium readable by the processor (including volatile and non-volatile memory and/or storage elements), at least one input device, and one or more output devices. Program code may be applied to data entered using an input device, such as a mouse or a keyboard, to perform process 16 and to generate output information.

Each such program may be implemented in a high level procedural or object-oriented programming language to communicate with a computer system. However, the programs can be implemented in assembly or machine language. The language may be a compiled or an interpreted language.

Each computer program may be implemented as a computer program stored on a storage medium (e.g., CD-ROM, hard disk, or magnetic diskette) that is readable by a general or special purpose programmable computer for configuring and operating the computer when the storage medium is read by the computer to perform process 16. Process 16 may also be implemented as an article of manufacture, such as a machine-readable storage medium, configured with a computer program, where, upon execution, instructions in the computer program cause a machine to operate in accordance with process 16.

The process described herein is not limited to the embodiments set forth herein. The order of the blocks in FIG. 2 may be changed to achieve the same result. The process is not limited to simulating rooms or indoor environments. The process can be used with any type of computer or video camera that together capture and process digital data. In this regard, the process is not limited to use with a digital video camera or to hand-held computers.

Other embodiments not described herein are also within the scope of the following claims.

What is claimed is:

1. A method comprising:
   generating a virtual three-dimensional environment using information from a single device, wherein the virtual three-dimensional environment is navigable to simulate movement in three dimensions in a real-world environment, and wherein generating comprises:
   determining a position of the device using the information; and
   identifying content of the virtual three-dimensional environment by using the information to locate at least three points of a plane in the real-world environment that behave similarly during motion relative to the position of the device;
   retrieving a virtual object; and
   rendering the virtual object in the virtual three-dimensional environment for display to a user;

wherein the simulated movement is independent of the position of the device.

2. The method of claim 1, wherein generating the virtual three-dimensional environment comprises:
surveying the real-world environment using the device;
generating three-dimensional data that defines the real-world environment using the position, the three-dimensional data corresponding to the content; and
rendering the virtual three-dimensional environment using the three-dimensional data.

3. The method of claim 1, further comprising:
scaling the virtual object in accordance with a size of the virtual three-dimensional environment.

4. The method of claim 3, wherein scaling comprises:
obtaining a size of a target in the real-world; and
changing a size of the virtual object in accordance with the size of the target.

5. The method of claim 1, further comprising:
illuminating the virtual object in the virtual three-dimensional environment to simulate lighting in the real-world environment.

6. The method of claim 1, wherein the virtual object is retrieved from a database comprised of pre-stored virtual objects.

7. A method comprising:
generating, using information from a single device, three-dimensional data that defines the real-world environment, wherein generating comprises:
determining a position of the device using the information; and
identifying, and generating three-dimensional data for, content of the virtual three-dimensional environment by using the information to locate at least three points of a plane in a real-world environment that behave similarly during motion relative to the position of the device;
rendering a virtual three-dimensional environment using the three-dimensional data for display to a user, wherein the virtual three-dimensional environment is navigable to simulate movement in three dimensions in the real-world environment;
retrieving a virtual object from a database comprised of pre-stored virtual objects;
rendering the virtual object in the virtual three-dimensional environment; and
re-positioning the virtual object in the virtual three-dimensional environment;
wherein the simulated movement is independent of the position of the device.

8. The method of claim 7, further comprising:
illuminating the virtual object in the virtual three-dimensional environment to simulate lighting in the real-world environment.

9. An article comprising a computer-readable medium that stores executable instructions to:
generate a virtual three-dimensional environment using information from a single device, wherein the virtual three-dimensional environment is navigable to simulate movement in three dimensions in a real-world environment, and wherein generating comprises:
determining a position of the device using the information; and
identifying content of the virtual three-dimensional environment by using the information to locate at least three points of a plane in the real-world environment that behave similarly during motion relative to the position of the device;
retrieve a virtual object; and
render the virtual object in the virtual three-dimensional environment for display to a user;
wherein the simulated movement is independent of the position of the device.

10. The article of claim 9, wherein generating the virtual three-dimensional environment comprises:
generating three-dimensional data that defines the real-world environment using the position, the three-dimensional data corresponding to the content; and
rendering the virtual three-dimensional environment using the three-dimensional data.

11. The article of claim 9, further comprising instructions that cause the computer to:
scale the virtual object in accordance with a size of the virtual three-dimensional environment.

12. The article of claim 11, wherein scaling comprises:
obtaining a size of a target in the real-world; and
changing a size of the virtual object in accordance with the size of the target.

13. The article of claim 9, further comprising instructions that cause the computer to:
illuminate the virtual object in the virtual three-dimensional environment to simulate lighting in the real-world environment.

14. The article of claim 9, wherein the virtual object is retrieved from a database comprised of pre-stored virtual objects.

15. An article comprising a computer-readable medium that stores executable instructions to:
generate, using information from a single device, three-dimensional data that defines the real-world environment, wherein generating comprises:
determining a position of the device using the information; and
identifying, and generating three-dimensional data for, content of the virtual three-dimensional environment by using the information to locate at least three points of a plane in a real-world environment that behave similarly during motion relative to the position of the device;
render a virtual three-dimensional environment using the three-dimensional data for display to a user, wherein the virtual three-dimensional environment is navigable to simulate movement in three dimensions in the real-world environment;
retrieve a virtual object from a database comprised of pre-stored virtual objects;
render the virtual object in the virtual three-dimensional environment; and
re-position the virtual object in the virtual three-dimensional environment;
wherein the simulated movement is independent of the position of the device.

16. The article of claim 15, further comprising instructions that cause the computer to:
illuminate the virtual object in the virtual three-dimensional environment to simulate lighting in the real-world environment.

17. An apparatus comprising:
a memory that stores executable instructions; and
a processor that executes the instructions to:
generate a virtual three-dimensional environment using information from a single device, wherein the virtual three-dimensional environment is navigable to simulate movement in three dimensions in a real-world environment, and wherein generating comprises:

determining a position of the device using the information; and identifying content of the virtual three-dimensional environment by using the information to locate at least three points of a plane in the real-world environment that behave similarly during motion relative to the position of the device;

retrieve a virtual object; and render the virtual object in the virtual three-dimensional environment for display to a user;

wherein the simulated movement is independent of the position of the device.

18. The apparatus of claim 17, wherein generating the virtual three-dimensional environment comprises:

generating three-dimensional data that defines the real-world environment using the position, the three-dimensional data corresponding to the content; and rendering the virtual three-dimensional environment using the three-dimensional data.

19. The apparatus of claim 17, wherein the processor executes instructions to:

scale the virtual object in accordance with a size of the virtual three-dimensional environment.

20. The apparatus of claim 19, wherein scaling compnses:

obtaining a size of a target in the real-world; and changing a size of the virtual object in accordance with the size of the target.

21. The apparatus of claim 17, wherein the processor executes instructions to:

illuminate the virtual object in the virtual three-dimensional environment to simulate lighting in the real-world environment.

22. The apparatus of claim 17, wherein the virtual object is retrieved from a database comprised of pre-stored virtual objects.

23. An apparatus comprising:

memory that stores executable instructions; and a processor that executes the instructions to:

generate, using information from a single device, three-dimensional data that defines the real-world environment, wherein generating comprises:

determining a position of the device using the information; and identifying, and generating three-dimensional data for, content of the virtual three-dimensional environment by using the information to locate at least three points of a plane in a real-world environment that behave similarly during motion relative to the position of the device;

render a virtual three-dimensional environment using the three-dimensional data for display to a user, wherein the virtual three-dimensional environment is navigable to simulate movement in three dimensions in the real-world environment;

retrieve a virtual object from a database comprised of pre-stored virtual objects;

render the virtual object in the virtual three-dimensional environment; and re-position the virtual object in the virtual three-dimensional environment;

wherein the simulated movement is independent of the position of the device.

24. The apparatus of claim 23, wherein the processor executes instructions to:

illuminate the virtual object in the virtual three-dimensional environment to simulate lighting in the real-world environment.

25. The method of claim 7, wherein the position of the device is used in rendering the virtual object.

26. The article of claim 15, wherein the position of the device is used in rendering the virtual object.

27. The apparatus of claim 23, wherein the position of the device is used in rendering the virtual object.

* * * * *